(12) United States Patent
Trewin et al.

(10) Patent No.: US 6,553,768 B1
(45) Date of Patent: Apr. 29, 2003

(54) COMBINED WATER-WASH AND WET-COMPRESSION SYSTEM FOR A GAS TURBINE COMPRESSOR AND RELATED METHOD

(75) Inventors: Richard Robert Trewin, Niskayuna, NY (US); William George Carberg, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/703,577

(22) Filed: Nov. 1, 2000

(51) Int. Cl.[7] .............................. F02C 3/30; F02C 7/30; F02C 7/00
(52) U.S. Cl. ..................... 60/772; 60/775; 60/39.53; 134/198
(58) Field of Search ................ 60/39.05, 39.53, 60/39.55, 39.57, 39.33, 775, 772; 134/195

(56) References Cited

U.S. PATENT DOCUMENTS

| | | | |
|---|---|---|---|
| 2,686,631 A | * 8/1954 | Jordan | ..................... 60/39.53 |
| 2,863,282 A | 12/1958 | Torell | |
| 2,974,482 A | * 3/1961 | Kelley | ..................... 60/39.53 |
| 3,623,668 A | * 11/1971 | Freid et al. | .................. 60/39.53 |
| 3,693,347 A | 9/1972 | Kydd et al. | |
| 3,747,336 A | 7/1973 | Dibelius et al. | |
| 3,785,146 A | 1/1974 | Bailey et al. | |
| 4,017,285 A | 4/1977 | Edwards | |
| 4,196,020 A | * 4/1980 | Hornak et al. | .......... 134/167 R |
| 4,259,837 A | 4/1981 | Russell et al. | |
| 4,785,622 A | 11/1988 | Plumley et al. | |
| 4,928,478 A | 5/1990 | Maslak | |
| 5,011,540 A | * 4/1991 | McDermott | ............. 134/22.18 |
| 5,193,976 A | * 3/1993 | Kolev et al. | .................. 134/23 |
| 5,353,585 A | * 10/1994 | Munk | ..................... 60/39.05 |
| 5,537,813 A | 7/1996 | Davis et al. | |
| 5,867,977 A | 2/1999 | Zachary et al. | |
| 5,868,860 A | * 2/1999 | Asplund | ..................... 134/22.1 |
| 5,930,990 A | 8/1999 | Zachary et al. | |
| 6,012,279 A | * 1/2000 | Hines | ..................... 60/39.05 |
| 6,073,637 A | * 6/2000 | Hayward et al. | ............ 134/198 |
| 6,286,301 B1 | * 9/2001 | Utamura | ..................... 60/39.53 |

FOREIGN PATENT DOCUMENTS

| | | |
|---|---|---|
| EP | 0770771 | * 10/1996 |
| JP | 8-303257 | * 11/1996 |

* cited by examiner

Primary Examiner—Ted Kim
(74) Attorney, Agent, or Firm—Nixon & Vanderhye P.C.

(57) ABSTRACT

A combined water-wash and wet-compression system for a gas turbine includes a compressor having an inlet defining a flow direction; and a plurality of manifolds arranged in proximity to the inlet and arranged transversely of the flow direction; a plurality of dual-function nozzles connected to the manifolds. Each dual-function nozzle is adapted to supply, selectively, either relatively small droplets for introduction into the compressor for intercooling, or relatively large droplets for impingement on components of the compressor for cleaning the components. A method of introducing a liquid into a compressor inlet for providing water wash for cleaning components of the compressor, and for providing wet compression for intercooling is also disclosed.

10 Claims, 3 Drawing Sheets

COMBINED WATER-WASH AND WET-COMPRESSION SYSTEM FOR A GAS TURBINE COMPRESSOR AND RELATED METHOD

BACKGROUND OF THE INVENTION

This invention relates to turbo machinery and, more particularly, to a combined water-wash and wet-compression system for the compressor of a gas turbine.

The compressor of a gas turbine requires periodic cleaning (sometimes referred to as water wash). One method of cleaning includes spraying droplets of cleanser into the inlet of the compressor. When this procedure is performed while the compressor is in operation, demineralized water is used and the droplets are sized to be large enough so that the drag forces are dominated by the inertia forces that tend to cause the droplets to impinge on the hardware of the compressor and provide the cleaning action.

It is also the case that a gas turbine compressor will require less power to operate at a given pressure ratio if intercooling is provided within the compressor. One method of providing intercooling includes spraying droplets of coolant into the inlet of the compressor. When the mixture of gas and water is compressed (generally referred to as wet compression), the temperature of the gas increases and provides the driving potential for evaporation. The evaporation of water cools the gas, and so acts as an intercooler. In this instance, coolant droplets are sized to be small enough so that the inertia forces are dominated by the drag forces that tend to cause the droplets to flow past the hardware of the compressor and travel into subsequent stages of the compressor where the droplets evaporate and provide the desired intercooling.

The current practice is to use separate systems for water washing and wet compression, each having their own set of controls and hardware.

BRIEF SUMMARY OF THE INVENTION

An arrangement is desired that will reduce the cost and complexity associated with separate water-wash and wet-compression systems. This invention relates to a device or system that will provide a stream of large droplets for water wash that will impinge on the hardware of the compressor and provide the required cleaning of the compressor, as well as a stream of small droplets for wet compression that will not impinge on the hardware of the compressor, but will flow into the downstream stages of the compressor where the droplets will evaporate to provide intercooling.

In accordance with this invention, water droplets for both water wash and wet compression are supplied by dual-function nozzles within a single system.

In the exemplary embodiments of the invention, modifications are made to current water-wash manifolds, nozzles and controls that permit atomizing air to be selectively provided to each nozzle. In this way, when the atomizing air is introduced, the droplets are reduced to a size small enough to bypass the hardware of the compressor and flow into the downstream stages of the compressor, thus adding an inter-cooling function to the apparatus that previously provided only a water-wash function. When the atomizing-air function is not utilized, the droplets are sufficiently large for impacting and thus cleaning the compressor hardware. Two types of dual-function nozzles are described herein. In one embodiment, the nozzles may be of a commercially available twin-fluid type where a sheet of liquid is disturbed by a high-velocity sheet of air so as to eventually cause the sheet to disintegrate into ligaments and then into small drops when in the atomization mode. For water wash, the flow of atomizing air is halted, and the liquid sheet is simply broken up by ambient air into large droplets suitable for water wash.

In a second exemplary embodiment, small droplets for wet compression are supplied by a commercially available electro-mechanical atomizer. Electro-mechanical atomizers are a family of atomizers that includes pressure atomizers, rotary atomizers, electrostatic atomizers, ultrasonic atomizers, vibrating-capillary atomizers, windmill atomizers and flashing atomizers, for example. This family of atomizers produces small droplets when the pressure of the liquid is increased, when an electric field is applied, when gas is dissolved, or when some component of the nozzle is set into motion. An ultrasonic atomizer utilizing piezoelectric discs is described herein. In this device, the piezoelectric discs produce cyclic contraction and expansion that results in a pressure wave that travels axially along the nozzle, interacting with the liquid in the nozzle to cause a mist of small droplets to be ejected from the nozzle. On deactivation, the liquid droplets return to the larger size suitable for water wash.

Thus, in its broader aspects, the present invention relates to a combined water-wash and wet-compression system for a gas turbine comprising a compressor having an inlet defining a flow direction; a plurality of manifolds arranged in proximity to the inlet and arranged transversely of the flow direction; a plurality of dual-function nozzles connected to the manifolds, each dual-function nozzle adapted to supply, selectively, relatively small droplets for introduction into the compressor for intercooling, or relatively large droplets for impingement on components of the compressor for cleaning the components.

In another aspect, the invention relates to a gas turbine system including a compressor, a gas turbine and a generator, a combined water-wash and wet-compression system for a gas turbine comprising a compressor having an inlet defining a flow direction; a plurality of manifolds arranged in proximity to the inlet and arranged transversely of the flow direction; a plurality of dual-function nozzles connected to the manifolds, each dual-function nozzle adapted to supply, selectively, relatively small droplets for introduction into the compressor for intercooling, or relatively large droplets for impingement on components of the compressor for cleaning the components.

In still another aspect, the invention relates to a method of introducing a liquid into a compressor inlet for providing water wash for cleaning components of the compressor, and for providing wet compression for intercooling, the method comprising:

a) providing at least one array of nozzles capable of supplying both large and small droplets of the liquid to an inlet of the compressor;

b) operating the array of nozzles in a first mode where the droplets of liquid are sufficiently large to impinge on the components of the compressor in a cleaning function; and c) operating the array of nozzles in a second mode where the droplets are sufficiently small to flow past the components of the compressor and into later stages of the compressor where the droplets evaporate for intercooling.

DETAILED DESCRIPTION OF THE INVENTION

Figure 1:
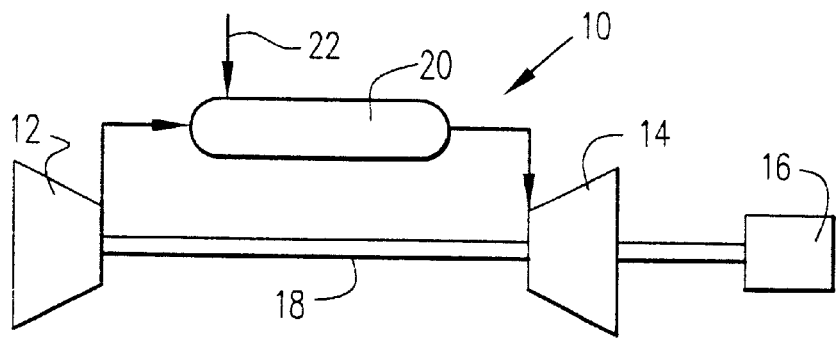
FIG. 1 is a schematic diagram of a typical simple-cycle gas turbine arrangement.

FIG. 1 shows a simple-cycle gas turbine system 10 including a compressor 12, turbine component 14 and generator 16 arranged in a single rotor or shaft 18. The compressor 12 supplies compressed air to the combustor 20 where it mixes with fuel supplied via stream 22.

Figure 2:
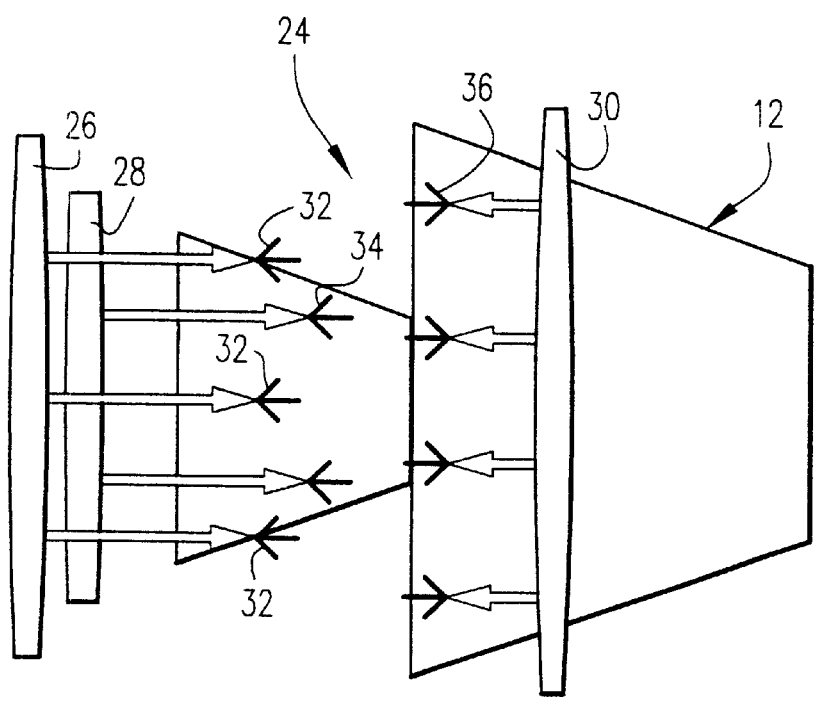
FIG. 2 is a schematic diagram of a known system of manifolds and nozzles of a water-wash system for supplying water to a gas turbine compression inlet.

Both water-wash and wet-compression procedures relate directly to the compressor 12. FIG. 2 illustrates in schematic form the bellmouth 24 at the inlet of the compressor 12. With the direction of flow indicated schematically by flow arrows at the nozzle inlets, it can be seen that the conventional water-wash system employs three water manifolds 26, 28, 30 oriented transverse to the flow direction, each manifold mounting respective arrays of single-function nozzles 32, 34, 36. Note that nozzles 36 on manifold 30 face in a direction opposite that of the nozzles 32, 34 of the manifolds 26, 28, respectively, to thereby insure good mixing and droplet formation.

Figure 3:
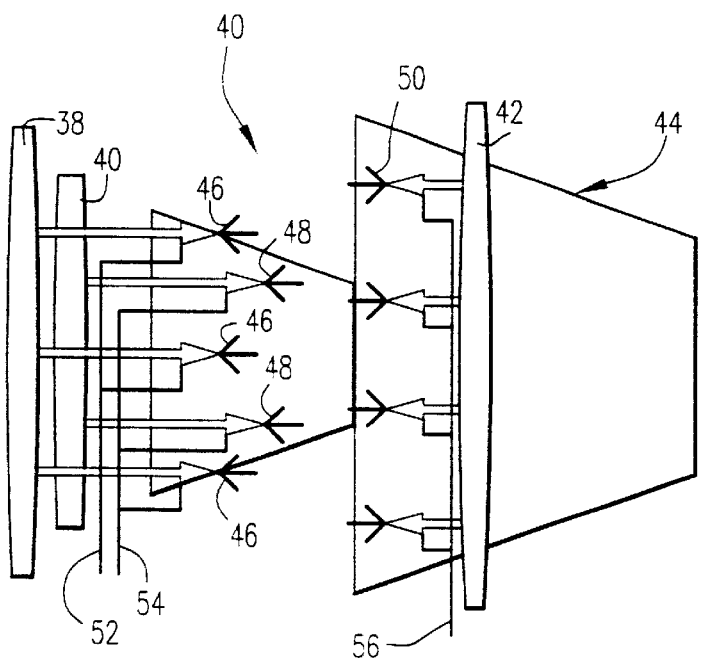
FIG. 3 is a schematic diagram of a modified water-wash system using additional manifolds and dual-function nozzles in accordance with a first exemplary embodiment of the invention.

Turning to FIG. 3, a modified water-wash system is shown. As in the system shown in FIG. 2, three water manifolds 38, 40 and 42 are arranged in proximity to the bellmouth 40 at the inlet of the compressor 44. The manifolds supply water to respective arrays of dual-function nozzles 46, 48 and 50. In addition, however, an air manifold 52 supplies atomizing air to the nozzles 46 associated with water manifold 58; air manifold 54 supplies atomizing air to the nozzles 48 associated with water manifold 40; and air manifold 56 supplies atomizing air to the nozzles 50 associated with water manifold 42.

Commercially available twin-fluid nozzles (atomizers) and electro-mechanical nozzles (atomizers) may be employed as the dual-function nozzles in the combined water-wash/wet-compression system of this invention.

Twin-fluid atomizers are sometimes referred to as air-assist atomizers or airblast atomizers, although the gas-phase fluid need not be air. For this family of nozzles, initial hydrodynamic instabilities are augmented by aerodynamic instabilities. In the air-assist atomizers, the liquid is spread into a thin conical sheet and then exposed to a high-velocity air stream.

Both twin-fluid and electro-mechanical atomizers have several features in common when the atomization function is not being utilized. They both start with a flow of liquid and produce a liquid sheet or jet. Disturbances are produced at the interface between the liquid and vapor, and these disturbances grow and eventually lead to disintegration into ligaments and then drops. The drops are sufficiently large to achieve the desired cleaning of compressor components.

Figure 4:
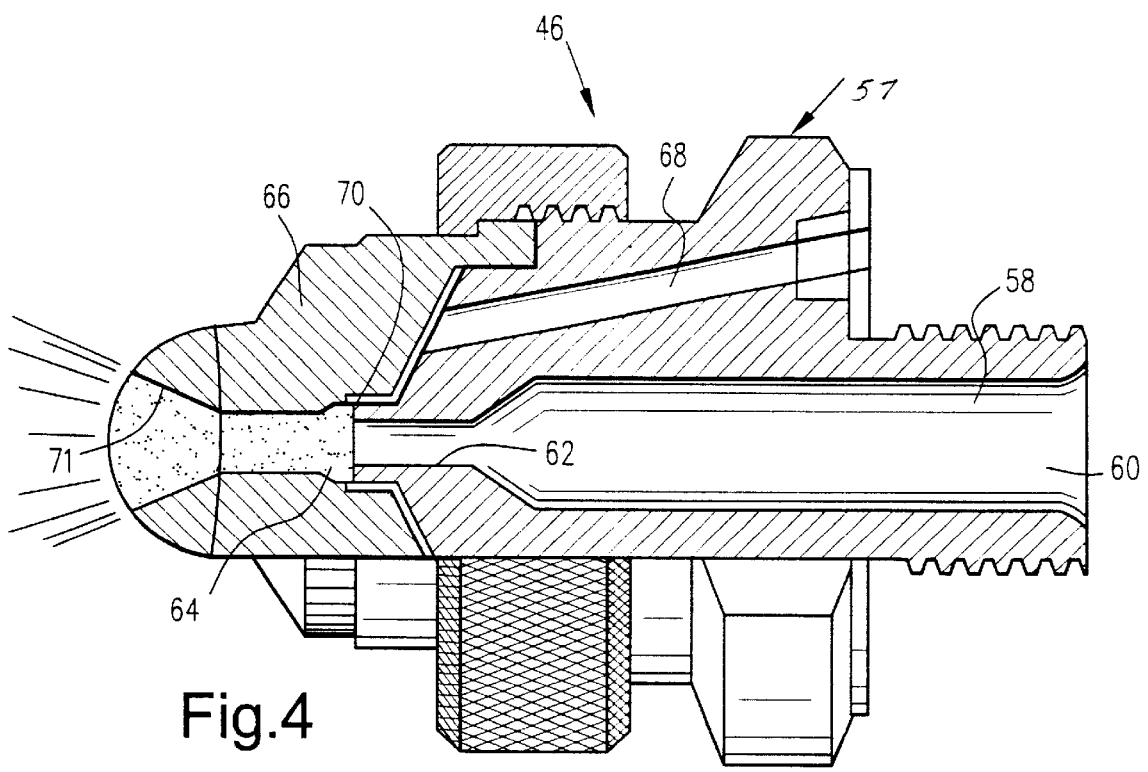
FIG. 4 is a cross-section of a twin-fluid dual-function nozzle for use in a first exemplary embodiment of the invention.

The dual-function nozzles 46, 48, 50 in the first embodiment may be commercially available, twin-fluid nozzles of the type sold by Spraying Systems Co. of Wheaton, Ill. (e.g., the "½ J Series"). One such nozzle is shown in FIG. 4. This nozzle includes a nozzle body assembly 57 is formed with a main through bore 58 with an inlet 60 at one end thereof. The through bore 58 has a reduced diameter center portion 62 that expands into a mixing chamber 64 in a discharge end 66 of the nozzle. An atomizing air bore 68 in the nozzle body supplies air to an annulus 70 that, in turn, supplies the air to the mixing chamber 64. In the mixing chamber, the water (or other liquid) is broken up by the atomizing air such that the droplets are reduced to a size adequate for bypassing the compressor and flowing downstream for wet compression where evaporation provides intercooling. When atomizing air is not supplied via bore 68, water exiting the center portion 62 flows into the chamber 64 and exits the nozzle via the conical orifice 71 as a conical sheet. The sheet is broken by the ambient air, forming water droplets that are sufficiently large for impacting and thus washing the hardware of the compressor.

Figure 5:
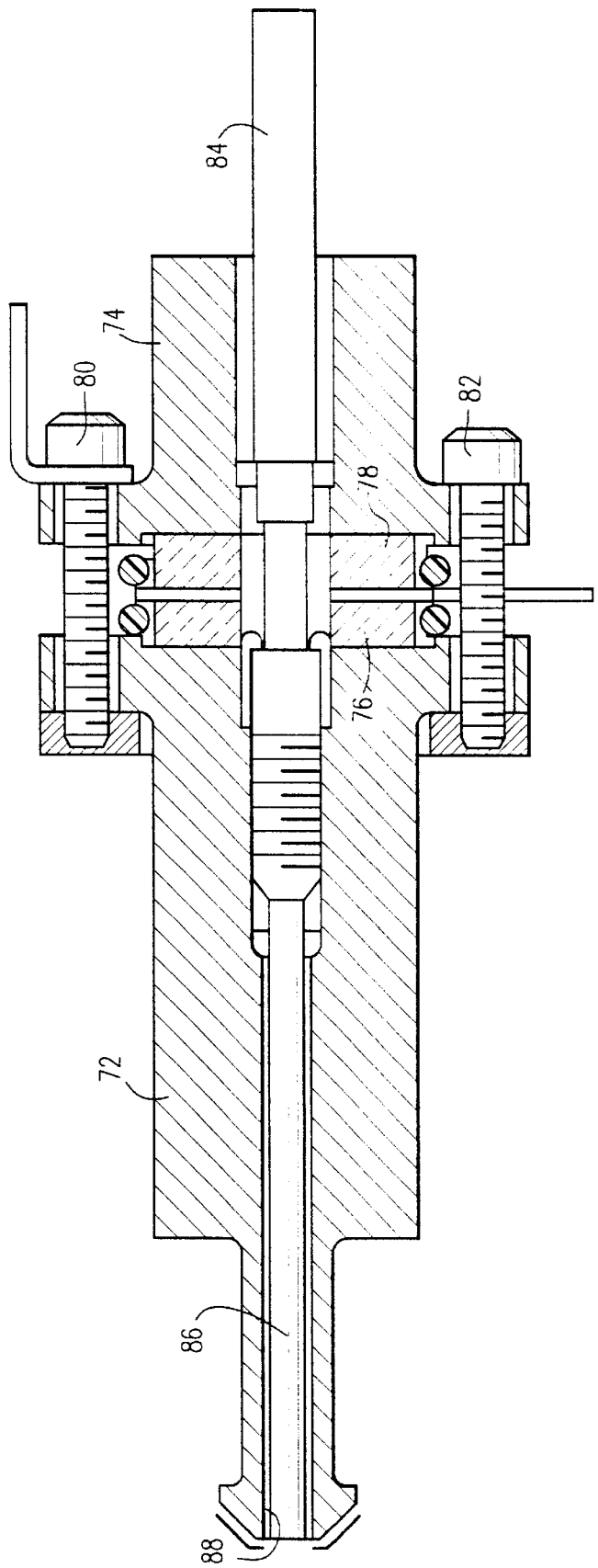
FIG. 5 is a cross-section of an electro-mechanical dual-function nozzle for use in a second embodiment of the invention.

In the second embodiment, each of the nozzles 46, 48, 50 in their respective arrays may also be a commercially available electro-mechanical, ultrasonic atomizer (146 in FIG. 5) presently available from the Sono-Tek Corporation of Milton, N.Y. Briefly, this nozzle includes an atomizing horn 72 and a reflecting horn 74 sandwiched about a pair of piezoelectric disks 76, 78 via assembly bolts or other suitable fasteners 80, 82. A liquid inlet tube 84 extends through the reflecting horn 74 as well as the disks 76, 78 and is joined with a sliding connection to a liquid feed tube 86 that is threadably secured in the atomizing horn 72. The piezoelectric disks 76, 78 expand and contract to produce cyclic expansion and contraction in the atomizing horn 72 and in the liquid feed tube 86. This, in turn, results in a travelling pressure wave that travels axially along the nozzle. The length of the nozzle is equal to one wavelength so that a standing wave pattern is established with an antinode at the nozzle discharge orifice or outlet 88. When liquid is introduced onto the rapidly vibrating tubes 84, 86, a checkerboard-like wave pattern appears at the interface between the liquid and vapor at the outlet 88. The wave crests increase to the point where they become unstable and collapse, causing a mist of small droplets to be ejected from the nozzle. The frequency of vibration is selected such that the resulting water droplets are small enough to avoid impaction of the compressor hardware, and thus provide droplets for wet compression.

It will be appreciated that the general arrangement of water supply manifolds may remain as shown in FIG. 3, but the air manifolds 52, 54 and 56 would be eliminated in favor of electrical leads (i.e., the schematic diagram would be the same but the lines designated as air manifolds would be referred to as electrical leads).

When the electric field is not applied, no pressure wave is established, and the droplets are sufficiently large for impinging and washing the compressor hardware.

It will be understood that the dual-function nozzles described above are exemplary only, and other suitable dual-function nozzles may be employed.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combined water-wash and wet-compression system for a gas turbine system comprising:

a compressor having an inlet defining a flow direction;

a plurality of annular arrays of dual-function twin fluid atomizer nozzles, each array having a water manifold and an air manifold for supplying water and air, respectively, to the dual-function nozzles in the respective array, each dual-function nozzle adapted to selectively produce for introduction into the compressor in a non-atomizing mode, droplets sufficiently large to impinge on components of the compressor and thereby clean said components, and, in an atomizing mode, droplets sufficiently small to bypass said components and thereby intercool said compressor.

2. The system of claim 1 wherein said plurality of dual-function nozzles includes at least two annular arrays of said dual-function nozzles arranged to direct flow in said flow direction.

3. The system of claim 2 including a third array of dual-function nozzles arranged to direct flow in a direction opposite said flow direction.

4. A combined water-wash and wet-compression system for a gas turbine system comprising:

a compressor having an inlet defining a flow direction;

a plurality of arrays of dual-function nozzles, each array having a water manifold for supplying water to the dual-function nozzles in the respective array, each dual-function nozzle comprising an ultrasonic transducer adapted to selectively produce for introduction into the compressor in a non-atomizing mode, droplets sufficiently large to impinge on components of the compressor and thereby clean said components, and, in an atomizing mode, droplets sufficiently small to bypass said components and thereby intercool said compressor.

5. A gas turbine system comprising a compressor, a turbine, a generator, and a combined water-wash and wet-compression system for the compressor, said combined water-wash and wet-compression comprising:

an inlet for the compressor, said inlet defining a flow direction;

a plurality of annular arrays of dual-function nozzles, each array connected to a water manifold and an air manifold for supplying water and air, respectively, to the dual-function nozzles in the respective array, each dual-function nozzle adapted to selectively produce for introduction into the compressor in a non-atomizing mode, droplets sufficiently large to impinge on components of the compressor and thereby clean said components, and, in an atomizing mode, droplets sufficiently small to bypass said components and thereby intercool said compressor.

6. The system of claim 5 wherein said dual-function nozzles each comprise a mechanical twin-fluid atomizer.

7. The system of claim 5 wherein one of said arrays of dual-function nozzles is arranged to direct flow in a direction opposite said flow direction.

8. A method of introducing a liquid into a compressor inlet for providing water wash for cleaning components of the compressor, and for providing wet compression for intercooling the compressor, the method comprising:

a) providing plural annular arrays of dual-function nozzles capable of supplying both large and small droplets of the liquid to the inlet of the compressor;

b) operating said plural annular arrays of dual-function nozzles in a first mode where the droplets of liquid are sufficiently large to impinge on the components of the compressor in a cleaning function; and c) operating said plural annular arrays of nozzles in a second mode where the droplets are sufficiently small to flow past the components of the compressor and into later stages of the compressor where the droplets evaporate for intercooling.

9. The method of claim 8 wherein said dual-function nozzles each comprise a mechanical twin-fluid nozzle.

10. The system of claim 8 wherein said dual-function nozzles each comprise an ultrasonic atomizer.

* * * * *